United States Patent Office 3,299,044
Patented Jan. 17, 1967

3,299,044
COMPLEX N-SUBSTITUTED AZABICYCLO-
ALKANES
John W. Cusic, Skokie, and Peter Yonan, Chicago, Ill.,
assignors to G. D. Searle & Co., Chicago, Ill., a corporation of Delaware
No Drawing. Filed Oct. 22, 1965, Ser. No. 502,289
8 Claims. (Cl. 260—239)

The present application is a continuation-in-part of application Serial No. 367,227, filed May 13, 1964, and now abandoned.

The present invention relates to a group of N-substituted azabicycloalkanes wherein the nitrogen substituent is a complex substituted alkyl group. The substituents on the alkyl group can include phenyl, pyridyl, and a carbonyl functional group. In particular, the present invention relates to compounds having the following general formula

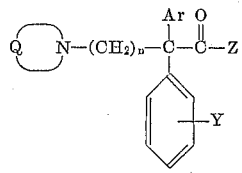

wherein

is an azabicycloalkane group; $n$ is a whole number greater than 1 and less than 4; Ar is selected from the group consisting of phenyl and pyridyl; Y is selected from the group consisting of hydrogen and halogen; and Z is selected from the group consisting of amino, dimethylamino, and pyrrolidino. The halogens can be fluorine, chlorine, bromine or iodine.

The azabicycloalkane group referred to above preferably contains from 7 to 9 carbon atoms in addition to the nitrogen atom through which it is attached to the remainder of the molecule. It is further preferred that no ring in the azabicycloalkane structure contains fewer than 5 atoms. Azabicyclononanes are of particular interest as this type of group. Examples of such structures are 3-azabicyclo[3.2.2]nonane, 2-azabicyclo[3.2.2]-nonane, 2-azabicyclo[3.3.1]nonane, 3-azabicyclo[3.3.1]-nonane, 2-azabicyclo[4.3.0]nonane, 7-azabicyclo[4.3.0]-nonane, and 8-azabicyclo[4.3.0]nonane. Some examples of azabicyclooctane groups are 6 - azabicyclo[3.2.1]-octane, 3 - azabicyclo[3.2.1]octane, and 2 - azabicyclo-[3.2.1]octane. Examples of azabicyclodecane are 8-azabicyclo[4.3.1]decane, 2-azabicyclo[4.4.0]decane, and 7-azabicyclo[4.2.2]decane. In addition, a double bond can be present as part of the azabicycloalkane structure. Examples of groups of this type are 3-azabicyclo[3.2.2]non-6-ene and 8-azabicyclo[4.3.0]non-3-ene. In no case does the nitrogen occupy a bridgehead position of the bicyclic structure.

A variety of procedures can be used for the preparation of the compounds of this invention. When Z is amino, a useful procedure involves an intermediate nitrile having the following formula

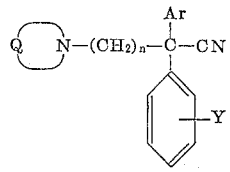

wherein

$n$, Ar, and Y are defined as above. Such a nitrile can be hydrolyzed with sulfuric acid to give the desired amide or, alternately, it can be hydrolyzed with alcoholic alkaline to give the amide.

A number of procedures are available for the preparation of the intermediate nitriles described above. Their applicability varies depending on the particular structure of the product desired. Thus, to prepare an $\alpha,\alpha$-diphenyl-alkanonitrile or similar substituted phenyl compounds, a useful procedure involves the reaction of an appropriate azabicycloalkane with a halide of the formula

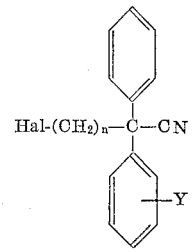

wherein $n$ and Y are defined as above and Hal is chlorine or bromine.

Alternately, the intermediate nitriles can be prepared by the reaction of an acetonitrile of the formula

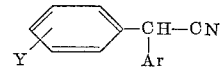

first with sodamide and then with an alkyl halide of the formula

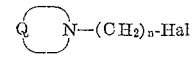

wherein Hal is chlorine or bromine and the other groups are defined as above. When Ar is pyridyl, the intermediate acetonitrile is obtained by the reaction of a benzyl cyanide with sodamide and an appropriate chloro- or bromo-substituted pyridine.

It should be obvious that the procedures for the preparation of the intermediate nitriles described above can also be used to prepare those compounds wherein Z is dimethylamino or pyrrolidino. In such a case, the starting material is the appropriate N-substituted diarylacetamide and the desired final product is obtained directly from the reaction without going through the hydrolysis step which is necessary when the product of the reaction is a nitrile.

The organic bases of this invention form non-toxic, acid-addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are useful because of their pharmacological properties. In particular, the present compounds possess a quinidine-like eurhythmic activity. These compounds also possess anti-inflammatory activity which is demonstrated by their phenylbutazone-like effect on edematous conditions. They are useful as anti-atherogenic agents because they inhibit hepatic synthesis of cholesterol. The present compounds also possess anti-bacterial activity which is demonstrated by their inhibition of the growth of the organism *Diplococcus pneumoniae*.

The following examples are presented to further illusstrate the present invention; they should not be construed as limiting it in spirit or in scope. In these examples, quantities are indicated in parts by weight and temperatures in degrees centigrade (° C.).

*Example 1*

A mixture of 300 parts of 3-bromopropanol, 250 parts of 3-azabicyclo[3.2.2]nonane, and 280 parts of potassium carbonate in 1200 parts of butanone is refluxed for 6 hours. The resultant mixture is filtered to remove the precipitated salt and the filtrate is distilled at reduced pressure. The portion distilling at about 145–160° C. at 5 mm. pressure is collected as 3-(3-hydroxypropyl)-3-azabicyclo[3.2.2]nonane.

A solution of 100 parts of 3-(3-hydroxypropyl)-3-azabicyclo[3.2.2]nonane in 375 parts of chloroform is saturated with hydrogen chloride gas. To this solution there is added, portionwise, 120 parts of thionyl chloride and the resultant mixture is refluxed for 1 hour. The mixture is then concentrated and ether is added. This causes a precipitate to form. This solid is recrystallized from a mixture of ethanol and ether to give 3-(3-chloropropyl)-3-azabicyclo[3.2.2]-nonane hydrochloride melting at about 262–265° C. This salt can readily be converted to the free amine by dissolving it in water and adding alkali.

*Example 2*

A mixture of 60 parts of 4-bromo-2,2-diphenylbutyronitrile, 25 parts of 3-azabicyclo[3.2.2]nonane and 30 parts of anhydrous potassium carbonate in 400 parts of butanone is refluxed for 7 hours. The resultant mixture is filtered and the solvent is evaporated from the filtrate under reduced pressure. The residue is dissolved in benzene and treated with charcoal. The resultant filtrate is concentrated and ether is added, whereupon a precipitate forms. This solid is recrystallized from a mixture of 2-propanol and ethyl acetate to give 2,2-diphenyl-4-(3-azabicyclo[3.2.2]non-3-yl)butyronitrile.

9 parts of the nitrile obtained above is mixed with 90 parts of concentrated sulfuric acid and heated on a steam bath for 2 hours. The reaction mixture is then poured over ice and the resulting aqueous mixture is made alkaline with ammonium hydroxide. An oil first forms but solidifies on standing and is separated by filtration. The solid is then dissolved in 2-propanol and mixed with a solution of excess hydrogen chloride in 2-propanol. Addition of ethyl acetate to the propanol solution causes crystals to form. The product thus obtained is 2,2-diphenyl - 4 - (3 - azabicyclo[3.2.2]non - 3 - yl)butyramide hydrochloride and it melts at about 253–254° C. The free base of this compound has the following formula

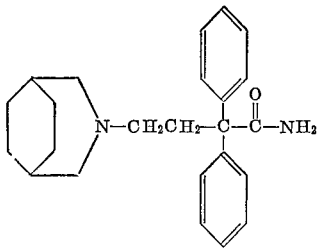

*Example 3*

A mixture of 54 parts of 5-chloro-2,2-diphenyl valeronitrile (obtained from the reaction of a benzene solution of diphenylacetonitrile first with sodamide and then with 1,3-dichloropropane), 25 parts of 3-azabicyclo-[3.2.2]-nonane, 30 parts of potassium carbonate, and 15 parts of sodium iodide in 400 parts of butanone is refluxed for 6 hours. The mixture is filtered to remove solids and the solvent is evaporated from the filtrate. The residue is dissolved in benzene and treated with charcoal. The solvent is evaporated from the treated solution to leave the free base which is converted to the hydrochloride by dissolving it in 2-propanol and adding a solution of excess hydrogen chloride in 2-propanol. The product thus obtained is 2,2-diphenyl-5-(3-azabicyclo[3.2.2]non-3-yl)valeronitrile hydrochloride melting at about 272–273° C.

A solution of 10 parts of the above nitrile hydrochloride in 90 parts of concentrated sulfuric acid is heated on a steam bath for 1 hour. The resultant mixture is then poured onto ice and made alkaline with ammonium hydroxide. The precipitate which forms is dissolved in 2-propanol and mixed with a solution of excess hydrogen chloride in 2-propanol. Ether is then added to the propanol solution to give a solid which is 2,2-diphenyl-5-(3-azabicyclo[3.2.2]non - 3 - yl) - valeramide hydrochloride melting at about 240–242° C.

*Example 4*

A mixture of 25 parts of benzyl cyanide, 35 parts of 2-bromopyridine and 220 parts of dry toluene is heated to 80° C. with stirring. Then, 19 parts of sodamide is added portionwise over a period of 1 hour while the temperature is maintained at 80–85° C. with some cooling. The resultant mixture is heated to 105° C. and a solution of 56 parts of 3-(2-chloroethyl)-3-azabicyclo[3.2.2]nonane in 220 parts of dry toluene is added portionwise. The mixture is then heated at 105–110° C. for an additional 3 hours before it is cooled and 250 parts of water is added. The organic layer is separated and dried and the solvent is evaporated to leave a residue which is dissolved in ether and filtered. The ether solvent is evaporated from the filtrate and the residual oil is distilled under reduced pressure to give material boiling at 200–201° C. at 0.1 mm. pressure. The product thus obtained is crystallized from hexane to give 2-phenyl-2-(2-pyridyl) - 4-(3-azabicyclo[3.2.2]non-3-yl)butyronitrile melting at about 80–81° C.

A solution of 25 parts of the above nitrile in 165 parts of concentrated sulfuric acid is heated on a steam bath for 2 hours. The resultant mixture is poured over ice and made alkaline by the addition of concentrated ammonium hydroxide. The precipitate which forms is separated by filtration and recrystallized from ethanol to give 2-phenyl-2-(2-pyridyl) - 4-(3-azabicyclo[3.2.2]non-3-yl)butyramide melting at about 156–157° C. This compound has the following formula

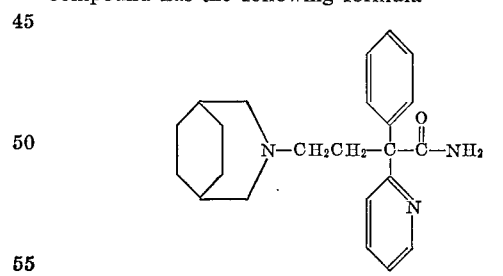

*Example 5*

An equivalent quantity of 4-bromopyridine is substituted for the 2-bromopyridine and the procedure described in Example 4 is repeated. In this way, there is first obtained 2-phenyl-2-(4-pyridyl)-4-(3-azabicyclo-[3.2.2]non-3-yl)butyronitrile. This is then hydrolyzed with sulfuric acid to give 2-phenyl-2-(4-pyridyl)-4-(3-azabicyclo[3.2.2]non-3-yl)butyramide.

*Example 6*

An equivalent quantity of 4-chlorobenzyl cyanide is substituted for the benzyl cyanide and the procedure described in Example 4 is repeated. In this way, there is first obtained 2-(4-chlorophenyl)-2-(2-pyridyl)-4-(3-azabiclyclo[3.2.2]non-3-yl)butyronitrile. This is then hydrolyzed with sulfuric acid according to the procedure described in the second paragraph of Example 4 to give 2-(4-chlorophenyl) - 2 - (2-pyridyl) - 4-(3-azabicyclo[3.2.2]non-3-yl)butyramide.

Example 7

The procedure of Example 4 is repeated using 60 parts of 3-(3-chloropropyl) - 3-azabicyclo[3.2.2]nonane in place of the 3-(2-chloroethyl) - 3-azabicyclo[3.2.2]-nonane. In this case, the residual oil obtained from the alkylation procedure is recrystallized from hexane to give 2-phenyl-2-(2-pyridyl) - 5-(3-azabicyclo[3.2.2]-non-3-yl)valeronitrile melting at about 86–87° C.

A solution of 20 parts of this nitrile in 130 parts of concentrated sulfuric acid is heated on a steam bath for 1.5 hours. The mixture is then poured onto ice and made alkaline with concentrated ammonium hydroxide. A precipitate forms and the mixture is extracted with ether. The solvent is then evaporated from the ether solution to leave a residual solid which is recrystallized from a mixture of acetone and hexane to give 2-phenyl-2-(2-pyridyl) - 5-(3-azabicyclo[3.2.2]-non - 3-yl)valeramide melting at about 139–140° C. This compound has the following formula

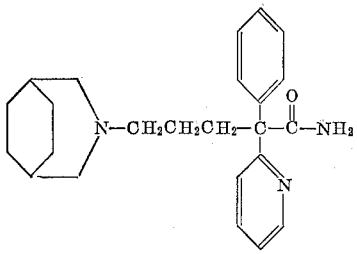

Example 8

A solution of 20 parts of N-diphenylacetylpyrrolidine (prepared from diphenylacetyl chloride and pyrrolidine) in 220 parts of dry toluene is heated to 100° C. Then, 3.5 parts of sodamide is added portionwise over a period of 20 minutes. The mixture is stirred at 100–105° C. for 1.5 hours after which a solution of 16 parts of 3-(3-chloropropyl) - 3-azabicyclo[3.2.2]nonane in 85 parts of dry toluene is added portionwise. The mixture is then heated at about 100° C. for an additional 2 hours. Water is added to dissolve the precipitated salts; the organic layer is separated and extracted with dilute hydrochloric acid. The acid extract is made alkaline with concentrated ammonium hydroxide and the precipitate which forms is separated and dissolved in ether. The solvent is evaporated from the ether solution to give a residual oil which subsequently solidifies. This solid is recrystallized from hexane to give 2,2-diphenyl-5-(3-azabicyclo[3.2.2]non-3-yl)valeric acid pyrrolidide melting at about 215–216° C. This compound has the following formula

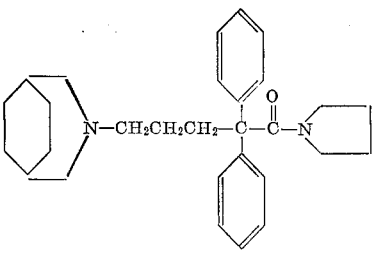

Example 9

An equivalent quantity of N,N-dimethyldiphenylacetamide is substituted for the N-diphenylacetylpyrrolidine and the procedure described in Example 8 is repeated. The product obtained in this way is N,N-dimethyl-2,2-diphenyl-5-(3-azabicyclo[3.2.2]non-3-yl)valeramide.

Example 10

To 2.8 parts of lithium amide in 450 parts of dry toluene there is added 19.3 parts of diphenylacetonitrile. The resultant mixture is stirred and refluxed under nitrogen for 2 hours. Then, a solution of 18.8 parts of 7-(2-chloroethyl)-7-azabicyclo[4.3.0]nonane in 870 parts of dry toluene is added portionwise. The resultant mixture is stirred and refluxed for 15 hours. The mixture is decomposed by the addition of water and then washed with dilute sodium hydroxide solution, dried, and distilled. This gives 2,2-diphenyl-4-(7-azabicyclo[4.3.0]non-7-yl)-butyronitrile distilling at about 203–210° C. at 0.15 mm. pressure.

16.7 parts of the nitrile obtained in the preceding paragraph is added to 4 parts of water and 80 parts of concentrated sulfuric acid. The mixture is then heated on a steam bath for 16 hours before it is poured onto ice. The resultant mixture is made alkaline with concentrated ammonium hydroxide and then extracted with methylene chloride. The combined methylene chloride extracts are washed with water and dried and the solvent is evaporated under reduced pressure. The residual solid is recrystallized first from aqueous methanol and then from ether to give 2,2-diphenyl-4-(7 - azabicyclo[4.3.0]-non-7-yl)butyramide melting at about 126–129° C.

The 7-(2-chloroethyl)-7-azabicyclo[4.3.0]nonane used as the starting material is prepared by the following procedure. 40 parts of octahydroindole and 22 parts of ethylene oxide are dissolved in 400 parts of methanol and the solution is allowed to stand for 15 hours. The solvent is then evaporated under reduced pressure and the residue is distilled to give 1-(2-hydroxyethyl)-octahydroindole boiling at about 84–102° C. at 1 mm. pressure. 24 parts of this alcohol is then dissolved in 530 parts of methylene chloride and the solution is saturated with hydrogen chloride gas. Thionyl chloride (160 parts) is added to the solution which is then refluxed for one hour. Low boiling materials are then removed under reduced pressure and dry benzene is added to the residue. The benzene is removed under reduced pressure and the addition and removal of benzene is repeated. The residue which results is dissolved in 130 parts of methylene chloride and the solution is diluted with about 550 parts of ethyl acetate. The resultant solution is treated with charcoal, filtered and concentrated under reduced pressure until crystals form in the residue. The resultant precipitate is collected by filtration and dried to give 7-(2-chloroethyl)-7-azabicyclo[4.3.0]nonane as a hygroscopic white powder melting at about 127–130° C.

Example 11

A solution of 17 parts of 8-azabicyclo[4.3.0]nonane hydrochloride, 36.0 parts of 4-bromo-2,2-diphenylbutyronitrile, 9.0 parts of powdered sodium hydroxide, and 10 parts of triethylamine in 110 parts of dimethyl sulfoxide is heated on a steam bath for 16 hours. The resultant mixture is poured into water and made strongly alkaline. The mixture is then extracted with ether and the combined ether extracts are washed well with water and then extracted with 10% hydrochloric acid. The resultant acid extract is made alkaline with sodium hydroxide solution and then extracted with ether. The combined ether extracts are dried, the solvent is evaporated, and the residual oil is distilled to give 2,2-diphenyl-4-(8-azabicyclo[4.3.0]non-8-yl)butyronitrile boiling at 220–225° C. at 0.3 mm. pressure.

15.0 parts of the nitrile obtained in the preceding paragraph is hydrolyzed with concentrated sulfuric acid according to the procedure described in the second paragraph of Example 10. In this case, the final product is purified by recrystallization from acetone to give 2,2-diphenyl-4-(8-azabicyclo[4.3.0]non-8 - yl)butyramide melting at about 129–131° C. This compound has the following formula

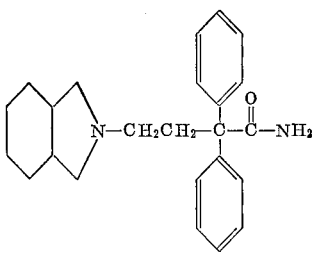

*Example 12*

The procedure of the first paragraph of Example 11 is repeated using 46.3 parts of 4-bromo-2,2-diphenylbutyronitrile, 28 parts of 2-azabicyclo[4.4.0]decane, 20 parts of triethylamine and 110 parts of dimethyl sulfoxide. In this case, the product is 2,2-diphenyl - 4 - (2 - azabicyclo-[4.4.0]dec-2-yl)butyronitrile which is a yellow oil boiling at about 221–222° C. at 0.4 mm. pressure.

26.0 parts of the nitrile obtained in the preceding paragraph is hydrolyzed with concentrated sulfuric acid according to the procedure described in the second paragraph of Example 10. The resultant crude product is recrystallized from acetone to give 2,2-diphenyl-4-(2-azabicyclo[4.4.0]dec-2-yl)butyramide as white needles melting at about 139–140° C.

*Example 13*

The procedure of the first paragraph of Example 11 is repeated using 12.6 parts of 6-azabicyclo[3.2.1]octane hydrochloride, 25.6 parts of 4-bromo-2,2-diphenylbutyronitrile, 7.2 parts of powdered sodium hydroxide, 10 parts of triethylamine, and 110 parts of dimethyl sulfoxide. The nitrile resulting from this reaction boils at about 210–215° C. at 1.0 mm. pressure. It is 2,2-diphenyl-4-(6-azabicyclo[3.2.1]oct-6-yl)-butyronitrile.

10.6 parts of the above nitrile is hydrolyzed with concentrated sulfuric acid according to the procedure described in the second paragraph of Example 10. In this case, the crude product is recrystallized from acetone to give 2,2-diphenyl-4-(6-azabicyclo[3.2.1]oct-6-yl)butyramide as white plates melting at about 157–158° C. This compound has the following formula

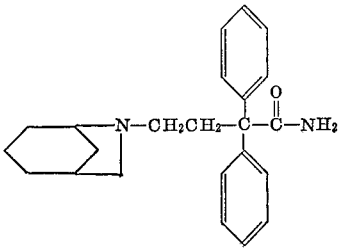

What is claimed is:
1. A compound of the formula

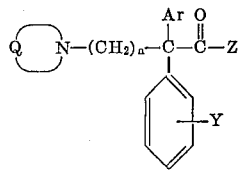

wherein

is azabicycloalkyl containing from 7 to 9 carbon atoms and containing at least 5 atoms in each ring of the azabicycloalkane structure; $n$ is a whole number greater than 1 and less than 4; Ar is selected from the group consisting of phenyl and pyridyl; Y is selected from the group consisting of hydrogen and chlorine; and Z is selected from the group consisting of amino, dimethylamino, and pyrrolidino.

2. A compound of the formula

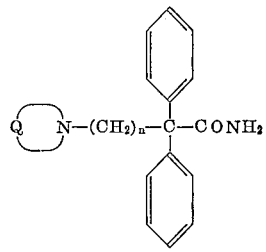

wherein

is azabicycloalkyl containing from 7 to 9 carbon atoms and containing at least 5 atoms in each ring of the azabicycloalkane structure; and $n$ is a whole number greater than 1 and less than 4.

3. 2,2-diphenyl-4-(3-azabicyclo[3.2.2]non-3 - yl)butyramide.

4. 2,2-diphenyl-5-(3-azabicyclo[3.2.2]non - 3 - yl)valeramide.

5. 2,2-diphenyl-4-(7-azabicyclo[4.3.0]non - 7 - yl)butyramide.

6. 2,2-diphenyl-4-(2-azabicyclo[4.4.0]dec - 2 - yl)butyramide.

7. 2-phenyl-2-(2 - pyridyl)-4-(3 - azabicyclo[3.2.2]non-3-yl)butyramide.

8. 2-phenyl-2-(2-pyridyl) - 5 - (3-azabicyclo[3.2.2]non-3-yl)valeramide.

No references cited.

ALEX MAZEL, *Primary Examiner.*

A. D. ROLLINS, *Assistant Examiner.*